US008768058B2

(12) United States Patent
Blose et al.

(10) Patent No.: US 8,768,058 B2
(45) Date of Patent: Jul. 1, 2014

(54) SYSTEM FOR EXTRACTING TEXT FROM A PLURALITY OF CAPTURED IMAGES OF A DOCUMENT

(75) Inventors: Andrew C. Blose, Penfield, NY (US); Peter O. Stubler, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 94 days.

(21) Appl. No.: 13/478,422

(22) Filed: May 23, 2012

(65) Prior Publication Data

US 2013/0315441 A1 Nov. 28, 2013

(51) Int. Cl.
*G06K 9/34* (2006.01)

(52) U.S. Cl.
USPC ......................................................... 382/177

(58) Field of Classification Search
None
See application file for complete search history.

(56) References Cited

U.S. PATENT DOCUMENTS

| | | | |
|---|---|---|---|
| 5,519,786 A | 5/1996 | Courtney et al. | |
| 5,805,747 A | 9/1998 | Bradford | |
| 6,694,059 B1* | 2/2004 | Zlotnick | 382/228 |
| 7,734,092 B2* | 6/2010 | Curtis et al. | 382/182 |
| 2003/0169926 A1* | 9/2003 | Sonmez et al. | 382/219 |
| 2009/0175538 A1* | 7/2009 | Bronstein et al. | 382/173 |
| 2009/0182548 A1* | 7/2009 | Zwolinski | 704/3 |
| 2010/0138376 A1* | 6/2010 | Avis et al. | 706/50 |
| 2011/0038543 A1* | 2/2011 | Bhattacharyya et al. | 382/187 |

OTHER PUBLICATIONS

Shi-Youn Neo et al: "Real-time online multimedia content processing", Proceedings of the 1$^{st}$ International Convention on Rehabilitation Engineering & Assistive Technology in Conjunction with 1$^{st}$ Tan Tock Seng Hospital Neurorehabilitation Meeting, I-Create '07, 2007, p. 201, XP055034093, New York, New York, USA; DOI: 10.1145/1328491.1328541; ISBN: 978-1-59-593852-7 the whole document.
Manmatha R. et al: "A hierarchical, HMM-based automatic evaluation of OCR accuracy for a digital library of books", Proceedings of the 6$^{th}$. ACM/IEEE Joint Conference on Digital Librariers. (JCDL 2006). Chapel Hill, Jun. 11-15, 2006; [Proceedings of the ACM/IEEE Joint Conference on Digital Libraries. JCDL], New York, NY : ACM, US, vol. Conf. 6, Jun. 11, 2006, Jun. 15, 2006, pp. 109-118, XP031055380, ISBN: 978-1-59593-354-6 Abstract section 1 section 2.
Carl Case et al: "Autonomous sign reading for semantic mapping", Robotics and Automatic (ICRA), 2011 IEEE International Conference On, IEEE, May 9, 2011, pp. 3297-3303, XP032034342, DOI: 10.1109/ICRA.2011, 5980523; ISBN: 978-1-61284-386-5; abstract; section IV, C: "Map annotation and post-processing".

(Continued)

*Primary Examiner* — Tahmina Ansari
(74) *Attorney, Agent, or Firm* — Kevin E. Spaulding (57) ABSTRACT

A system including a data processing system, a network interface for communicating over a network, and a program memory storing instructions configured to cause the data processing system to implement a method for extracting textual information from images of a document containing text characters. The method includes receiving a plurality of digital images of the document over the network. Each of the captured digital images is automatically analyzed using an optical character recognition process to determine extracted textual data. The extracted textual data for the captured digital images are merged to determine the textual information for the document, wherein differences between the extracted textual data for the captured digital images are analyzed to determine the textual information for the document.

17 Claims, 8 Drawing Sheets

(56) References Cited

OTHER PUBLICATIONS

Alistair Willis et al: "Improving search in scanned documents: Looking for OCR mismatches", Workshop on Advanced Technologies for Digital Libraries, ICSD—International Conference for Digital Libraries and the Semantic Web, Sep. 8, 2009, XP055075398, Trento, Italy Retrieved from the Internet: URL:http://oro.open.ac.uk/20855/1/paper-15.pdf [retrieved on Aug. 15, 2013] the whole document.

Jian Liang et al: "Camera-based analysis of text and documents: a survey", International Journal of Document Analysis and Recognition (IJDAR), Springer, Berlin, DE, vol. 7, No. 2-3, Jul. 2005 pp. 84-104, XP019352711, ISSN: 1433-2825, DOI: 10.1007/S10032-004-0138-Z Abstract section 2.3, section 2.4, section 4.2.1; section 4.5; section 5, section 5.2.

"Needleman—Wunsch algorithm," http://en.wikipedia.org/wiki/Needleman-Wunsch_algorithm, accessed May 22, 2012.

"Levenshtein distance," http://en.wikipedia.org/wiki/Levenshtein_distance, accessed May 22, 2012.

* cited by examiner

| Reference Line | The quick brown fox jumped over the lazy dog, Sir! | — 700
| --- | --- | --- |
| Non-Reference Line #1 | The quick brown fox jumped over the lazy dog, Sir! | — 705
| Non-Reference Line #2 | The quick brown fox jumped over the lazy dog, Sir! | — 710
| Non-Reference Line #3 | The quick browm fox jumped over fhe lazy dog, 8ir! | — 715

FIG. 7A

| 0 | 1 | 2 | 3 | 4 | 5 | 6 | 7 | 8 | 9 |
|---|---|---|---|---|---|---|---|---|---|
| The : 4 | quick : 4 | brown : 2 | fox : 4 | jumped : 3 | over : 4 | the : 3 | lazy : 4 | dog, : 4 | Sir! : 3 |
|  |  | browm : 2 |  | jumped : 1 |  | fhe : 1 |  |  | 8ir! : 1 |

SYSTEM FOR EXTRACTING TEXT FROM A PLURALITY OF CAPTURED IMAGES OF A DOCUMENT

CROSS-REFERENCE TO RELATED APPLICATIONS

Reference is made to commonly assigned, co-pending U.S. patent application Ser. No. 13/478,409, entitled: "Textual information extraction method using multiple images", by Blose; and to commonly assigned, co-pending U.S. patent application Ser. No. 13/478,409, entitled: "Image Capture Device For Extracting textual information", by Blose, each of which is incorporated herein by reference.

FIELD OF THE INVENTION

This invention pertains to the field of image processing and data analysis, and more particularly to the extraction of textual information from a document using multiple digital images of the document.

BACKGROUND OF THE INVENTION

With hand-held digital capture devices becoming pervasive in modern society, more and varied uses for them become apparent. The ability to capture an image of a printed document with one's cell phone or digital camera and have that image converted into useful data such as text is highly desirable and has many applications. The traditional means of converting a printed document into textual information usually requires the use of a document scanner and an optical character recognition (OCR) system. The quality of the images produced by document scanners is typically excellent and the OCR process on these types of images is generally very good, although not always perfect. In general, the better the quality level of images provided to the OCR process, the better the textual output generated will be.

While images of documents captured by a cell phone or digital camera are convenient, they are generally inferior in quality to images generated using document scans. Various factors such as lens system aberrations, camera position, camera movement and lighting uniformity and brightness, contribute to the poorer image quality images. Because of the inferior image quality level, these images typically produce unacceptable results when an OCR process is used to extract textual information.

A number of methods have been proposed for improving OCR output. However, these methods are inefficient and insufficient to provide adequate results for images of documents captured using hand-held digital imaging devices.

U.S. Pat. No. 5,519,786 to Courtney et al., entitled "Method and apparatus for implementing a weighted voting scheme for multiple optical character recognition systems," describes a method that involves processing an input file using a plurality of different OCR processors. For a particular character in the document, the characters reported by each OCR processor are grouped into a set of character candidates. For each character candidate, a weight is generated in accordance with a confusion matrix which stores probabilities of a particular OCR to identify characters accurately. The weights are then compared to determine which character candidate to output.

U.S. Pat. No. 5,805,747 to Bradford, entitled "Apparatus and method for OCR character and confidence determination using multiple OCR devices," describes another method which uses a plurality OCR processors. Each of different OCR processors outputs recognized characters along with the OCR processor's own determination of how confident it is in the identification of the correct characters. The OCR system uses that data output from each of the different OCR processors along, with other attributes of the indicated character to produce a combined confidence indication.

U.S. Pat. No. 7,734,092 to Curtis et al., entitled "Multiple image input for optical character recognition processing systems and methods," describes a method for selecting processing a captured image through a plurality of binarization and OCR processes to provide corresponding OCR output files, and selecting between the resulting OCR output files based on associated metrics.

While some of the foregoing methods can provide somewhat improved results, there remains a need to provide better results with a more practical solution.

SUMMARY OF THE INVENTION

The present invention represents a system for extracting textual information from a document containing text characters using a digital image capture device, comprising:

a network interface for communicating with one or more remote systems over a network;

a data processing system; and a program memory communicatively connected to the data processing system and storing instructions configured to cause the data processing system to implement a method for extracting textual information from images of a document containing text characters, wherein the method includes:

receiving a plurality of digital images of the document over the network, the plurality of digital images being captured using a digital image capture device;

automatically analyzing each of the received digital images using an optical character recognition process to determine extracted textual data for each captured digital image;

merging the extracted textual data for the received digital images to determine the textual information for the document, wherein differences between the extracted textual data for the received digital images are analyzed to determine the textual information for the document; and storing the textual information for the document in a processor-accessible memory.

This invention has the advantage that it can utilize multiple images of a document captured by a digital image capture device to improve the extraction of textual information from the document. This enables common digital capture devices to be used to more reliably create text data.

It has the additional advantage that textual information can be reliably extracted from documents using hand-held digital imaging devices that provide lower quality images.

It has the further advantage that computationally intensive processing steps can be performed on a data processing system having more computational power than the digital image capture device.

It is to be understood that the attached drawings are for purposes of illustrating the concepts of the invention and may not be to scale.

DETAILED DESCRIPTION OF THE INVENTION

In the following description, some embodiments of the present invention will be described in terms that would ordinarily be implemented as software programs. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, together with hardware and software for producing and otherwise processing the image signals involved therewith, not specifically shown or described herein may be selected from such systems, algorithms, components, and elements known in the art. Given the system as described according to the invention in the following, software not specifically shown, suggested, or described herein that is useful for implementation of the invention is conventional and within the ordinary skill in such arts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Figure 1:
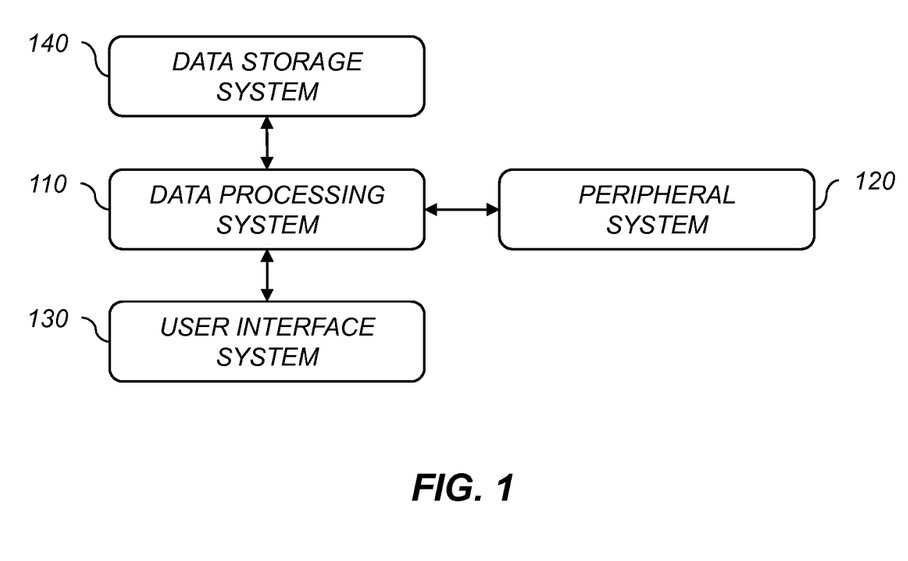
FIG. 1 is a high-level diagram showing the components of a system for extracting textual information from a document according to an embodiment of the present invention.

FIG. 1 is a high-level diagram showing the components of a system for extracting textual information from a document according to an embodiment of the present invention. The system includes a data processing system 110, a peripheral system 120, a user interface system 130, and a data storage system 140. The peripheral system 120, the user interface system 130 and the data storage system 140 are communicatively connected to the data processing system 110.

The data processing system 110 includes one or more data processing devices that implement the processes of the various embodiments of the present invention, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

The data storage system 140 includes one or more processor-accessible memories configured to store information, including the information needed to execute the processes of the various embodiments of the present invention, including the example processes described herein. The data storage system 140 may be a distributed processor-accessible memory system including multiple processor-accessible memories communicatively connected to the data processing system 110 via a plurality of computers or devices. On the other hand, the data storage system 140 need not be a distributed processor-accessible memory system and, consequently, may include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data may be communicated. The phrase "communicatively connected" is intended to include a connection between devices or programs within a single data processor, a connection between devices or programs located in different data processors, and a connection between devices not located in data processors at all. In this regard, although the data storage system 140 is shown separately from the data processing system 110, one skilled in the art will appreciate that the data storage system 140 may be stored completely or partially within the data processing system 110. Further in this regard, although the peripheral system 120 and the user interface system 130 are shown separately from the data processing system 110, one skilled in the art will appreciate that one or both of such systems may be stored completely or partially within the data processing system 110.

The peripheral system 120 may include one or more devices configured to provide digital content records to the data processing system 110. For example, the peripheral system 120 may include digital still cameras, digital video cameras, cellular phones, or other data processors. The data processing system 110, upon receipt of digital content records from a device in the peripheral system 120, may store such digital content records in the data storage system 140.

The user interface system 130 may include a mouse, a keyboard, another computer, or any device or combination of devices from which data is input to the data processing system 110. In this regard, although the peripheral system 120 is shown separately from the user interface system 130, the peripheral system 120 may be included as part of the user interface system 130.

The user interface system 130 also may include a display device, a processor-accessible memory, or any device or combination of devices to which data is output by the data processing system 110. In this regard, if the user interface system 130 includes a processor-accessible memory, such memory may be part of the data storage system 140 even though the user interface system 130 and the data storage system 140 are shown separately in FIG. 1.

A preferred embodiment of the present invention will now be described with reference to FIG. 2, which illustrates a method for extracting textual information 235 from an input document 200. A capture digital images step 205 is used to capture a set of digital images 210 of the document 200 using a digital image capture device. In a preferred embodiment, the digital image capture device is a hand held photographic device such as a digital camera or a camera phone. In other embodiments, the digital image capture device can be positioned on a tripod or some other type of mounting bracket, or can be some other type of device such as a hand-held document scanner.

Figure 2:
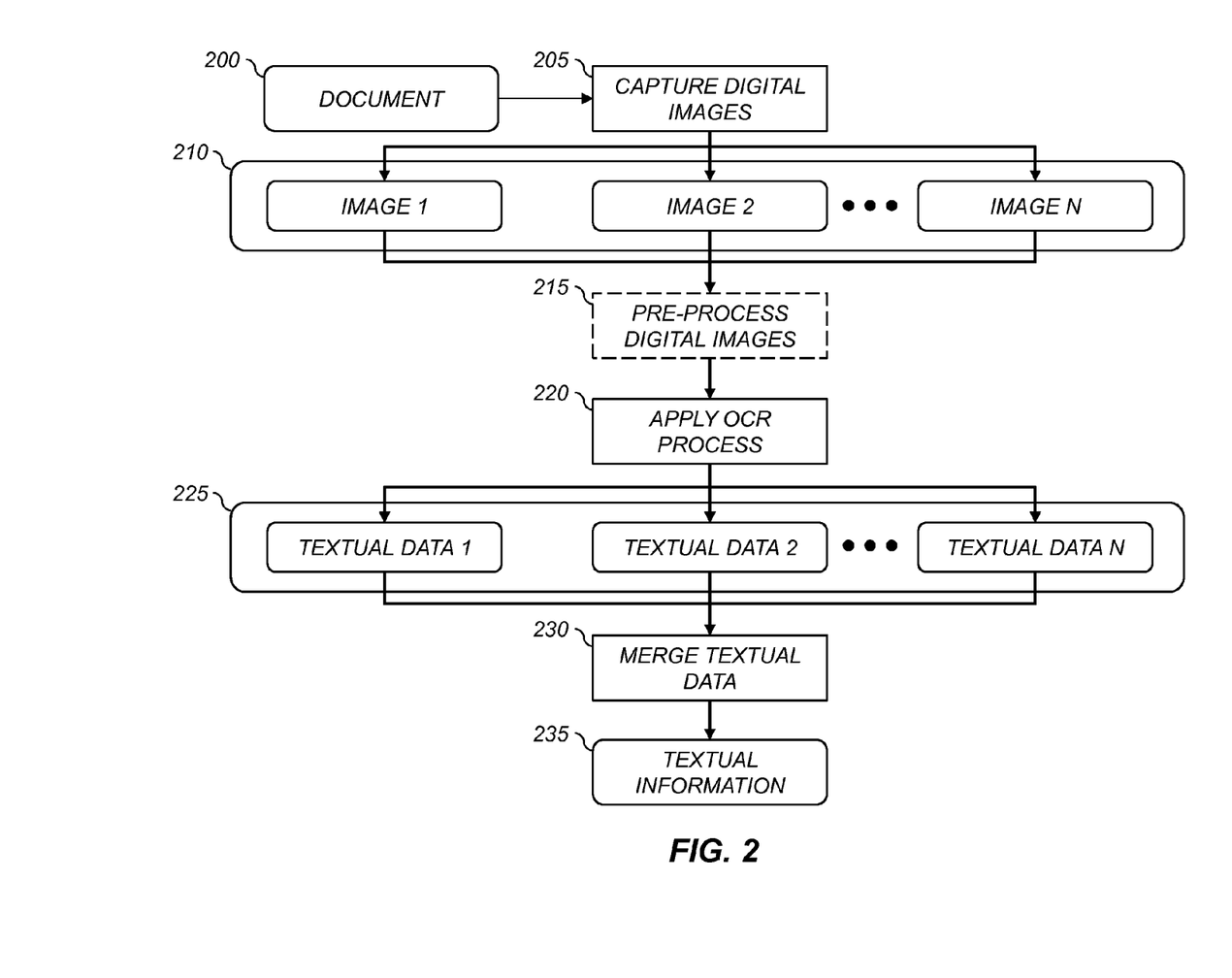
FIG. 2 is a flow chart of a method for extracting textual information from a document in accordance with the present invention.
Figure 3:
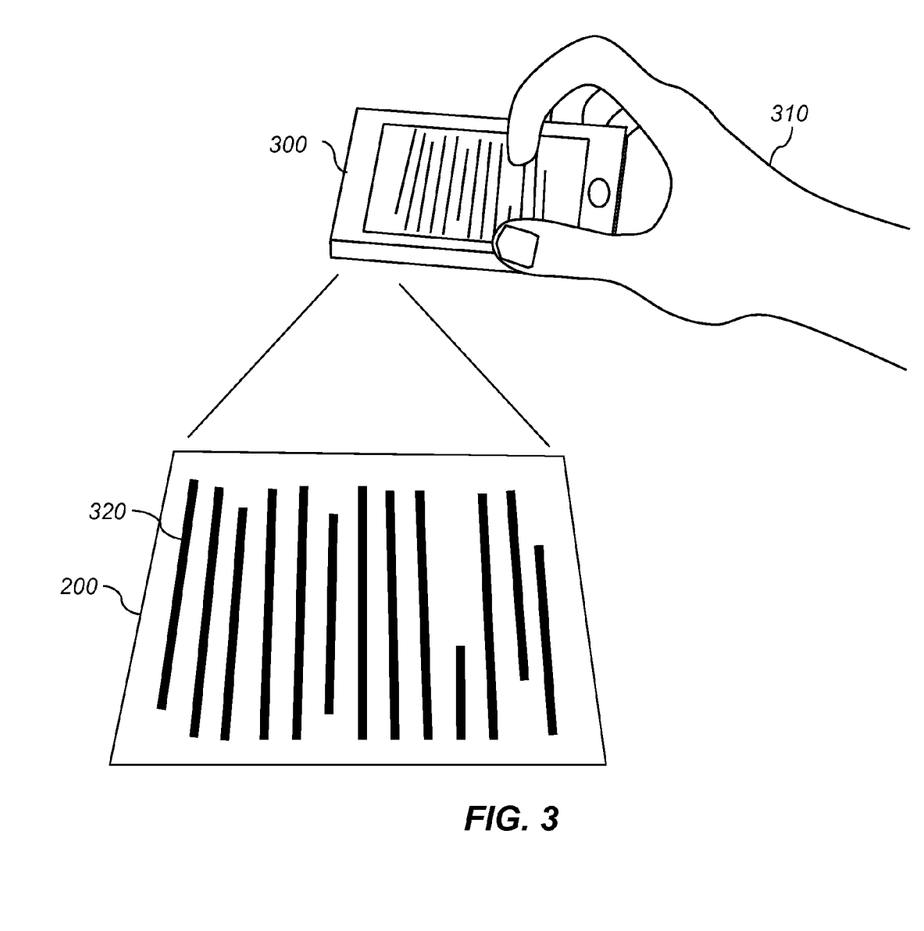
FIG. 3 depicts an image capture process using a digital image capture device.

FIG. 3 shows a depiction of a typical image capture process that can be used for the capture digital images step 205 (FIG. 2) in accordance with an embodiment of present invention. A digital image capture device 300 is provided for capturing digital images. The digital image capture device 300 includes an image sensor and an optical system for forming an image of a scene onto the image sensor. The digital image capture device 300 will also include a variety of other components including a data processor, a storage memory and a program memory. In accordance with the present invention, the digital image capture device 300 (e.g., a camera phone) is held by a user at a distance from the document 200 that contains textual content 320 (i.e., text characters), and a plurality of digital images of the document 200 is captured by the digital image capture device 300. Ideally, the user controls the digital image capture device 300 so that the document 200 fills the image frame to provide the maximum resolution while capturing the complete document 200.

In some embodiments, the digital image capture device 300 can be operated in a conventional mode to capture the plurality of digital images 210, each of which are each stored in a corresponding digital image file. The set of digital image files can then be processed by an application to extract the textual information 235 (FIG. 2) in accordance with the present invention.

In some embodiments, the digital image capture device 300 can be operated in a special document capture mode that automatically implements that method of the present invention. The document capture mode can be a native mode provided by the device manufacturer. Alternately, the document capture mode can be provided by application software (e.g., an "App") that is downloaded onto the digital image capture device 300 by the user. Preferably, when the digital image capture device 300 is operating in the document capture mode, only a single activation of a user control on the capture device is required to capture the plurality of digital images 210. Software running on the digital image capture device 300 then automatically captures a series of digital images 210 over a small time span, such as 1 to 2 seconds.

Preferably, the set of captured digital image 210 are all a little bit different from each other in order to provide slight variations in textual data 225 (FIG. 2) extracted from the captured images. In some embodiments the slight variations in the captured images are naturally induced due to normal small movements of the user's hand 310 during the image capture process. Even minor movements of the digital image capture device 300 during image capture (e.g., due to camera shake) produces variations in the captured digital images 210 that cause the corresponding extracted textual data 225 to vary between captures.

The movements of the digital image capture device 300 can include translation, rotation, tilting and changes in the object distance. Translation and rotation of the digital image capture device 300 will cause the alignment of the image pixels and the text characters to vary. Tilting the digital image capture device 300 with respect to the plane of the document 200 often affects the size and sharpness of the edges of the image. Any text characters at the edges of the document may become more or less recognizable by OCR processes due to these variations. Movements of the capture device closer or further from the document being photographed can change the size of the appearance of the text in the captured image. Again, this may cause the text to be more or less recognizable by OCR processes.

In some embodiments, the capture settings of the digital image capture device 300 are held constant during the image capture process. In other embodiment of the present invention, one or more of the capture settings of the digital image capture device 300, such as an exposure setting or a lens focus setting, can be adjusted between captures to introduce variations in the captured digital images 210.

Returning to a discussion of FIG. 2, the digital images 210 of the document 200 can optionally be processed by a pre-process digital images step 215 to improve the quality of the digital images 210. In different embodiments, the processing applied by the pre-process digital images step 215 can include a variety of different operations.

In some embodiments, the pre-process digital images step 215 can apply an alignment operation to align the digital images 210 to each other so that corresponding textual content occurs at the same spatial location.

In some embodiments, the pre-process digital images step 215 can apply a distortion correction operation to correct for geometrical distortions introduced by the optical system (e.g., "pincushion" or "barrel" distortion), or by any rotation and tilt of the digital image capture device. Ideally the distortion correction operation would provide text that is arranged in straight horizontal lines.

In some embodiments, the pre-process digital images step 215 can apply a tone/color processing operation. For example, a histogram equalization algorithm can be used to stretch the contrast of the digital images so that the text is dark and the background is light. In some embodiments tone/color processing adjusts the color to provide a grayscale digital image from an input color digital image 210.

The pre-process digital images step 215 can also apply other types of operations such as noise reduction and sharpening. Any parameters associated with such operations should be chosen to maximize the probability that the text will be recognizable by an OCR process.

In some embodiments, the pre-process digital images step 215 uses the method described in commonly-assigned, co-pending U.S. patent application Ser. No. 13/348,676 to Morales, entitled "Method for enhancing a digitized document," which is incorporated herein by reference. This method processes a captured image of a document to provide an enhanced image with a background that is essentially white and a foreground that is essentially black. These enhanced images will generally yield more accurate results when they are processed using an OCR algorithm.

An apply OCR process step 220 is next used to apply an optical character recognition (OCR) process to extract textual data 225 from each of the individual digital images 210. OCR processes are well-known in the art, and any available OCR process that generates textual data as output can be used for the apply OCR process step 220 in accordance with the present invention. In a preferred embodiment, the apply OCR process step 220 uses the OCR process provided in the commercially-available OmniPage software available from Nuance Communications, Inc of Burlington, Mass.

The sets of textual data 225 provided by the apply OCR process step 220 each correspond to a particular digital image 210. The textual data 225 contains lines of text, each containing one or more words. In addition to alphabetic characters associated with a particular language (e.g., English (Roman) kanji, hanzi, Greek, Hebrew, Cyrillic, Arabic), the textual data can include other types of characters such as numbers and symbols (e.g., "$", "#", "@", "+").

Figure 4:
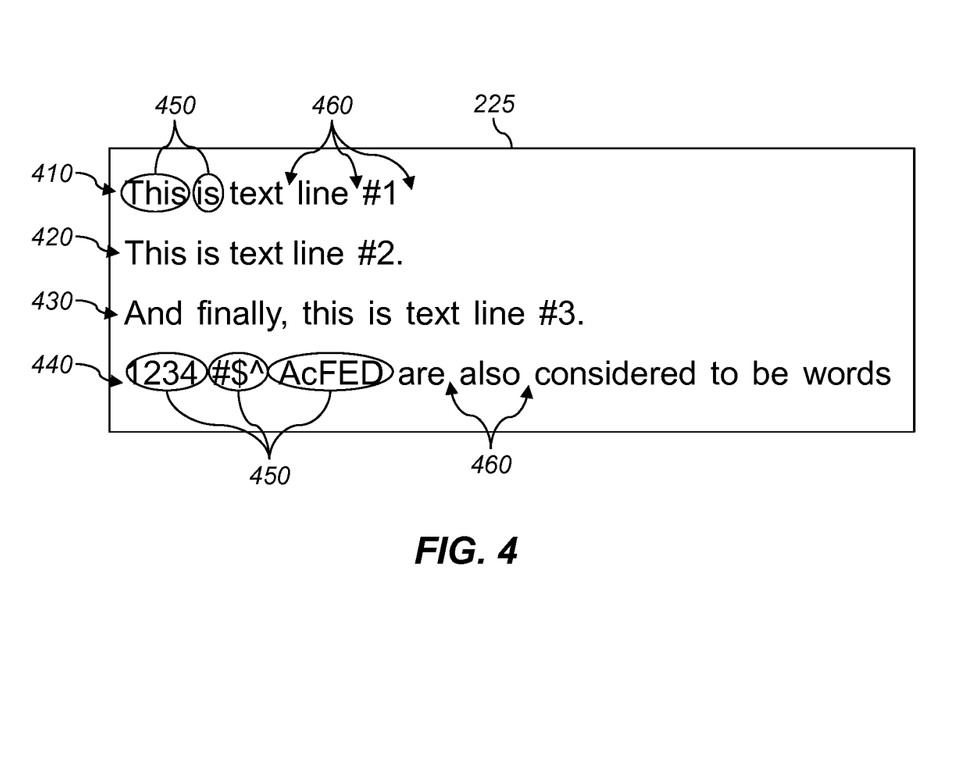
FIG. 4 shows an example of textual data determined from a digital image captured using a digital image capture device.

An example of textual data 225 obtained by applying an OCR process to a captured digital image 210 (FIG. 2) is shown in FIG. 4. There are four lines of text 410, 420, 430 and 440. Each line of text 410, 420, 430 and 440 contains a sequence of words 450 separated by whitespace 460. Whitespace is generally considered to be any character or series of characters that represents space between words (e.g., a "space" character, a "carriage return" character or a tab character). OCR processors generally place one or more whitespace characters between words. It should be noted that in the context of this description, words 450 are considered to be a series of contiguous non-whitespace characters surrounded by whitespace 460, and do not necessarily correspond to "words" found in written human language as shown in line of text 440.

Returning to a discussion of FIG. 2. a merge textual data step 230 is used to merge the extracted textual data 225, to determine the textual information 235 for the document 200. The sets of textual data 225 determined from each of the digital images 210 will generally not be in perfect agreement due to errors made during the apply OCR process step 220. During the merge textual data step 230, differences between the extracted textual data 225 for the captured digital images 210 are analyzed to determine the best estimate for the actual textual information 235 in the document 200.

Figure 6:
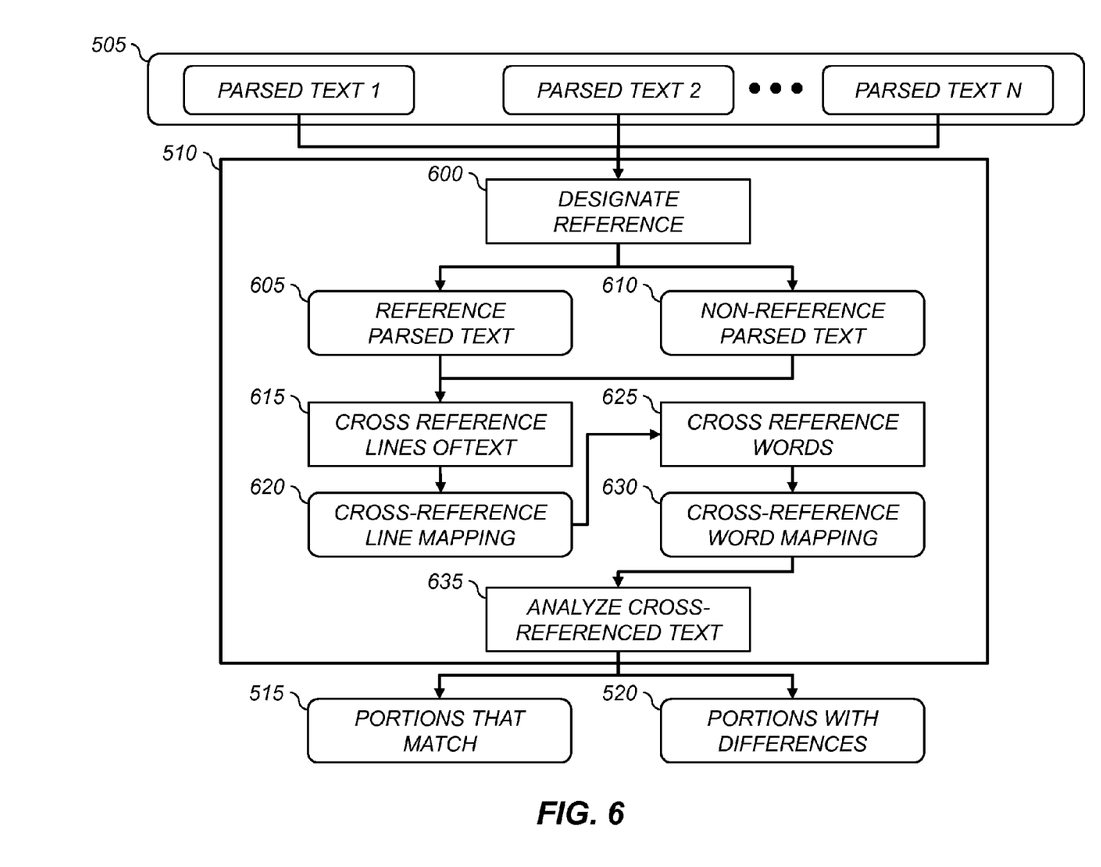
FIG. 6 is a flow diagram showing additional details of the determine corresponding portions step of FIG. 5 according to an embodiment of the present invention.

The merge textual data step 230 can determine the textual information 235 using a variety of different merging processes. FIG. 6 shows a flowchart illustrates an example of a merging process that can be used by the merge textual data step 230 according to a preferred embodiment. The fundamental idea of the merging process is to utilize the extracted textual data 225 from multiple sources to build a consensus for the correct output wherever there may be differences between corresponding portions of the extracted textual data 225.

Figure 5:
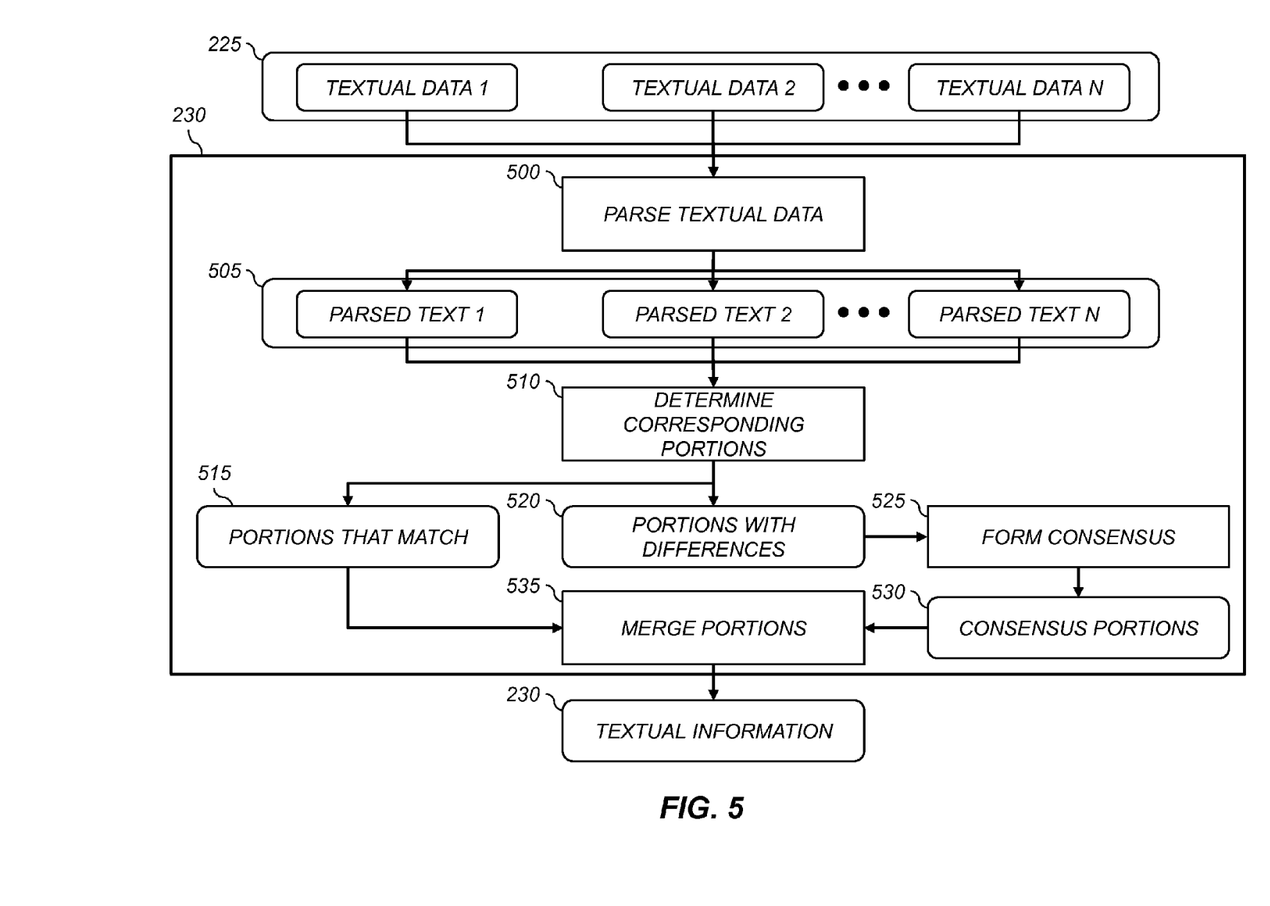
FIG. 5 is a flow chart showing additional details of the merge textual data step of FIG. 2 according to an embodiment of the present invention.

A parse textual data step 500 is used to parse the textual data 225 determined from each of the digital images 210 (FIG. 2) to determine corresponding parsed text 505. Typically, the textual data 225 will be stored in OCR output text files in the data storage system 140 (FIG. 1), which are read and processed using the data processing system 110 (FIG. 1). Preferably, the OCR output text files are stored in the data storage system 140 using a hierarchical structure that reflects the fact that they correspond to the same document 200 (FIG. 2). For example, the OCR output text files can all be stored in a common directory in the file structure using a naming convention that uses a common root name with a numerical suffix (e.g., "TextualData1.txt", "TextualData1.txt", . . . "TextualDataN.txt").

Each of the OCR output text files stores a representation of the document containing lines of text line, each line of text in turn containing one or more words 450 (FIG. 4). The parse textual data step 500 parses each line of text into words based on the location of the whitespace 460 (FIG. 4) in the line of text. The process of reading and parsing text information is known to anyone skilled in the art and will not be described in detail here.

A determine corresponding portions step 510 is used to correlate the sets of parsed text 505 to determine corresponding portions of the textual data 225. The corresponding portions will generally contain some portions that match 515 where the parsed text 505 from each of the digital images 210 are in agreement, and portions with differences 520 where there are differences between corresponding portions of the parsed text 505.

There are a variety of ways that the determine corresponding portions step 510 can analyze the parsed text 505 to determine the corresponding portions in accordance with the present invention. FIG. 6 illustrates one such method that can be used in some embodiments. A designate reference step 600 is used to select one set of parsed text 505 to be used as a set of reference parsed text 605. All other sets of parsed text 505 besides the reference parsed text 605 are designated to be non-reference parsed text 610.

In a preferred embodiment, the reference parsed text 605 is selected based on determining which set of parsed text 505 contains the highest percentage of valid words. The percentage is determined by looking up each word in a dictionary of known words and recording when a word is found in the dictionary. The dictionary can be a set of words for a specific human language, or can be an application-specific dictionary containing a set of words that are commonly found in the type of document being processed, or can be a combination of the two. The goal of selecting the reference parsed text 605 is to select the set of parsed text 505 that is most likely to be an accurate representation of the textual content of the original document 200 (FIG. 2).

In some embodiments, the designate reference step 600 can select the reference parsed text 605 based on a plurality of different factors. For example, another factor that can be useful to consider in selecting the reference parsed text is the total number of lines of text in the set of parsed text 505. Set of parsed text 505 containing fewer lines of text may be the result of a captured digital image 210 where the document 200 that has been cropped at the top or bottom by the photographer. Any method known to those skilled in the art can be used to combine the plurality of factors (e.g., a weighted combination of the different factors).

In cross reference lines of text step 615, the reference parsed text 605 is used to determine a cross-reference line mapping 620 for each of the sets of non-reference parsed text 610. The cross-reference line mapping 620 is a mapping of the lines of text in the non-reference parsed text 610 to the corresponding lines of text in the reference parsed text 605.

While there are many possible ways of determining the cross-reference line mapping 620 known to those skilled in the art, in a preferred embodiment the well-known global sequence alignment algorithm known as the Needleman-Wunsch algorithm is used. The Needleman-Wunsch algorithm is an example of a global sequence alignment algorithm that uses a dynamic programming technique. There are a variety of other global sequence alignment methods that are well-known in the art which can be used in accordance with the present invention, including other types of dynamic programming algorithms, heuristic algorithms and probabilistic algorithms.

While not originally designed for processing textual information, the Needleman-Wunsch algorithm can be adapted to the present problem in a straight-forward fashion. In general terms, the algorithm seeks to find the best alignment of two arbitrary sequences of data elements. The first step of this algorithm constructs a (m×n) similarity matrix (S) representing the similarity of the corresponding elements from the two sequences (of dimension m and n) being aligned. The elements of the matrix are the results of a match score between the elements. The overall alignment score is determined from the last element in the similarity matrix (S[m,n]). The actual alignment is determined using a traceback through the similarity matrix.

Commonly, the Needleman-Wunsch algorithm is used for the alignment of character sequences representing genetic components. In the present invention the cross-reference line mapping 620 is determined by using Needleman-Wunsch to find the best alignment of the lines of text between the reference parsed text 605 and each of the sets of non-reference parsed text 610. Accordingly, the optimal alignment is determined by calculating a match score between the data elements of one sequence and all data elements of another. To apply Needleman-Wunsch to text lines, one need only provide a means of calculating a match score between two text lines.

Text line match scores can be calculated in any suitable fashion known to those skilled in the art as long as the method used provides a higher score for a better match. In the preferred embodiment, the text line match scores is determined by once again applying the Needleman-Wunsch algorithm to determine the alignment of the words in the text lines. The word match score required by this level of Needleman-Wunsch is determined in the preferred embodiment using the well-known Levenshtein distance. The Levenshtein distance is considered to be an "edit" distance. It represents the difference between two character strings as the amount of changes required for a first string to be changed to the second string. The Levenshtein distance is used to calculate a word match score ($M_{AB}$) for two words (wordA and wordB) as shown in the following equation:

$$M_{AB} = \frac{(\max(\text{length}(wordA), \text{length}(wordB)) - D_L(wordA, wordB)}{\max(\text{length}(wordA), \text{length}(wordB))} \quad (1)$$

Where max(n,m) is the greater of the two values m and n, length(s) is the length of the string s in number of characters, and $D_L$(wordA,wordB) is the Levenstein distance between the two words (wordA and wordB).

Once the cross-reference line mapping 620 has been determined a cross-reference words step 625 is used to determine a cross-reference word mapping 630 for the sets of non-reference parsed text 610. The cross-reference word mapping 630 is a mapping of the words in the lines of text in the non-reference parsed text 610 to the corresponding words in the reference parsed text 605. For each line of text in the reference parsed text 605, the corresponding lines of text in the sets of non-reference parsed text 610 (as specified in the cross-reference line mapping 620) are processed to align the words. In a preferred embodiment, the Needleman-Wunsch algorithm is once again used to align the words in each line of text in the reference parsed text 605 with the corresponding words in the corresponding line of text in each of the sets of non-reference parsed text 610.

Figure 7A:
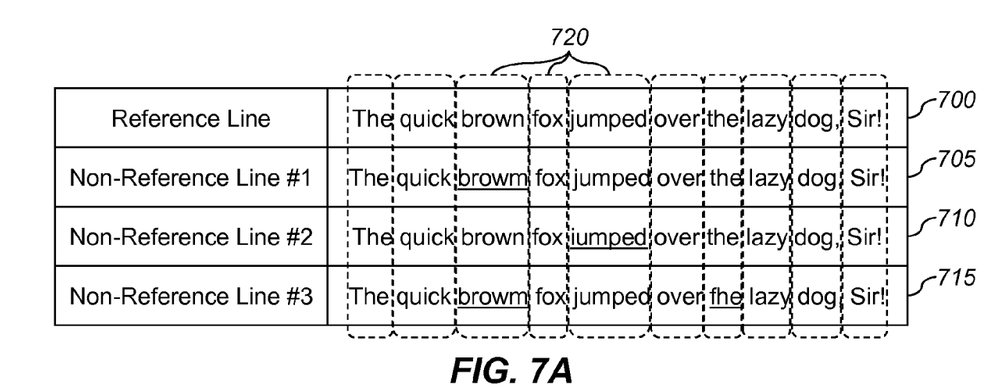
FIG. 7A shows a set of aligned words for a line of text.

The table in FIG. 7A shows example of the alignment of three different non-reference lines of text 705, 710 and 715 with a reference line of text 700. The reference line of text 700 is shown at the top and the non-reference lines of text 705, 710 and 715 are shown below. The underlined words in the lines of text are examples of typical errors that commonly occur in OCR processing. Corresponding words 720 in the lines of text are indicated by dashed outlines. The corresponding words 720 form the basis for the cross-reference word mapping 630. This information can be encoded using any convenient format.

Returning to a discussion of FIG. 6, an analyze cross-referenced text step 635 analyzes the cross-reference word mapping 630 to determine the portions that match 515 and the portions with differences. The portions that match 515 are those words where the set of corresponding cross-referenced words all match each other. The portions with differences 520 are those words where at least one of the cross-referenced words is different than the others.

Figure 7B:
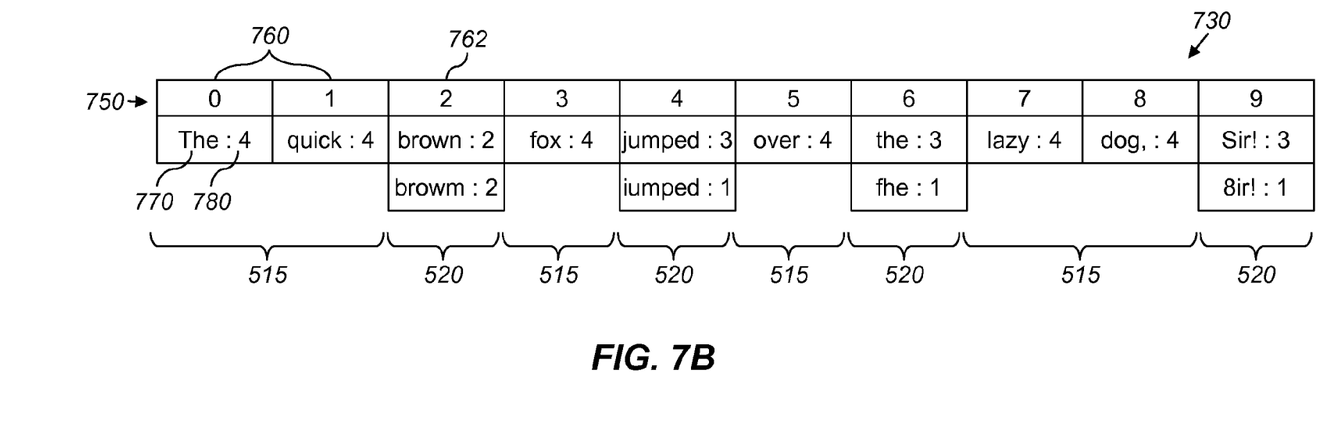
FIG. 7B shows a word histogram determined for the aligned words in FIG. 7A.

The portions that match 515 and the portions with differences 520 can be determined using any convenient method. In a preferred embodiment, a word histogram 730 is formed for each set of corresponding words as shown in FIG. 7B to count the number of occurrences of each aligned word. Each histogram bin 760 has an associated bin ID 750 which corresponds to the relative position of the word within the lines of text. Each histogram bin 760 contains one or more word 770 and a corresponding word count 780. In this example, the word count 780 is the number of occurrences of the word 770 in the aligned lines of text in FIG. 7A.

The portions that match 515 and the portions with differences 520 can be determined in a straightforward manner by analyzing the word histogram 730. The histogram bins that contain only one word variation (i.e., histogram bins #0, #1, #3, #5, #7 and #8) are designated to be portions that match 515. For the portions that match 515, these words can be directly used to define the corresponding portion of the textual information 235 (FIG. 2) for the document 200. The histogram bins that contain more than one word variation (i.e., histogram bins #2, #4, #6 and #9) are designated to be portions with differences 520.

Returning to a discussion of FIG. 5, a form consensus step 525 is used to determine consensus portions 530 for each of the portions with differences 520. The consensus portions 530 can be determined using any method known in the art. In some embodiments, a majority voting process is used where the consensus portions 530 are determined by analyzing the word histogram 730 that was discussed relative to FIG. 7B to select the word with the highest word count 780 for each of the histogram bins 760 that contain more than one word variation. For histogram bins 760 where there is a tie for the word having the highest word count (e.g., histogram bin #2), a tie-breaking method can be used. In a preferred embodiment, the candidate words can be compared to the words in a dictionary of known words, and preference is given to words that appear in the dictionary. If both words appear in the dictionary, the word appearing in the reference line of text 700 is preferentially selected.

In some embodiments, the dictionary used to evaluate the candidate words can be supplemented with context-dependent words. In a preferred embodiment, any words that are included in the portions that match 515 (indicating consensus across all of the sets of textual data 225) are automatically added to the dictionary if they are not already found in the dictionary. In a variation of this approach, a word can be added to the dictionary even if it corresponds to a portion with differences 520 if the amount of agreement between the sets of textual data 225 is above a predefined threshold (e.g., 80%). In some embodiments, the context-dependent words can include words that are associated with a particular type of document. In some embodiments, a user interface can be provided that enables a user to manually enter words into the dictionary.

The example embodiment that was discussed above for the form consensus step 525 uses a sequential process to determine the consensus portions 530, first considering the word counts 780, and if there is a tie proceeding to consider whether the word candidates are in a dictionary, and finally if there is still a tie selecting the word from the reference line of text 700. In other embodiments, the consensus portions 530 can be selected based on a merit function that combines a plurality of factors. For example, a merit function can be defined that simultaneously considers the word counts 780, whether the word candidates are in a dictionary, and which word is found in the reference line of text 700. One such merit function value $C_w$ that can be determined for each of the candidate words in a set of corresponding words 720 is given by:

$$C_w = W_v V_w + W_d D_w + W_r R_w \qquad (2)$$

where $V_w$ is the word count 780 for a particular candidate word, $D_w$ is a dictionary term which is "1" for candidate words that are found in the dictionary and is "0" when for candidate words that are not found in the dictionary, R, is "1" for candidate words that are found in the reference line of text 700 and is "0" when for candidate words that are not found in the reference line of text 700, and $W_v$, $W_d$ and $W_r$ are weighting constants that can be used to weight the relative importance of each term. The merit function values $C_w$ can be determined for each of the candidate words in the set of corresponding words 720, and the candidate word with the highest merit function value can be selected to be used for the consensus portion 530. In alternate embodiments, rather than being a simple binary value, the dictionary term $D_w$ can be determined based on the Levenshtein distance to the closest word in the dictionary.

Returning to a discussion of FIG. 5, a merge portions step 535 is used to merge the portions that match 515 and the consensus portions 530 that were determined for each of the portions with differences 520 to determine the final textual information 235 for the document 200 (FIG. 2). The textual information 235 will generally be stored in a text file in the data storage system 140. The text file will have a series of lines of text, each of which includes a sequence of words corresponding to each of the portions that match 515 and the consensus portions 530.

In some embodiments, the method of the present invention can be implemented using application software that is executed using a data processing system 110 (FIG. 1) located in the digital image capture device 300 (FIG. 3). In some cases, the application software can be provided by the device manufacturer. Alternately, the method of the present invention can be provided by application software (e.g., an "App") that is downloaded onto the digital image capture device 300 by the user.

Figure 8:
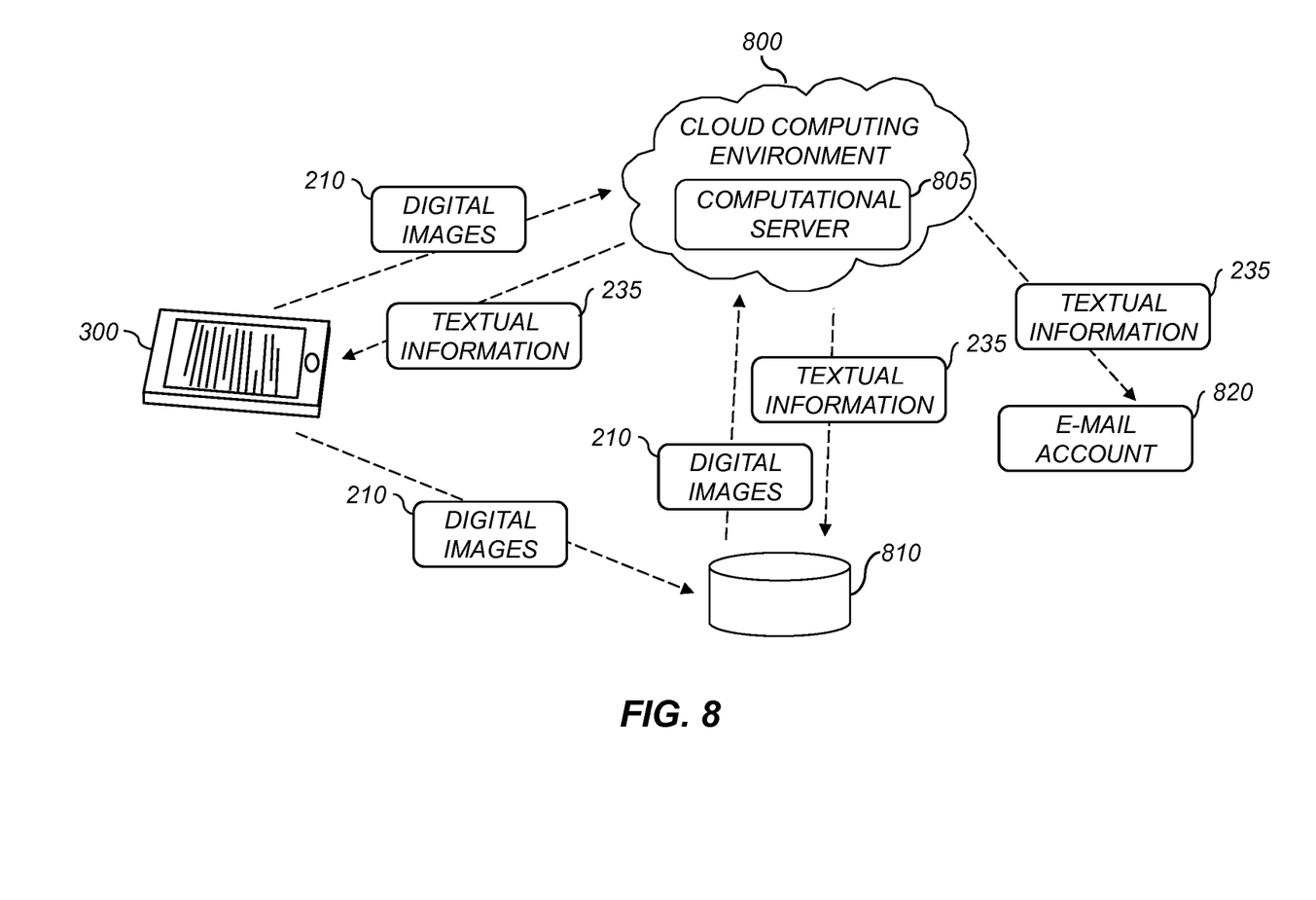
FIG. 8 illustrates a distributed system including a computational server that can be used to implement the method of the present invention.

Since many of the computations involved with implementing the method of the present invention can be somewhat computationally intensive, it may be desirable in some embodiments to perform some or all of the processing steps using a data processing system 110 having more computational power than that found in a typical digital image capture device 300 (e.g., in a camera phone). FIG. 8 illustrates a distributed system for implementing the method of the present invention where the captured digital images 210 are transmitted (e.g., using a wireless network) from the digital image capture device 300 to a remote system (e.g., a computational server 805 in a cloud computing environment 800). In some embodiments, the digital images 210 are first transmitted to a file server 810 before they are transmitted to the remote system. The digital images 210 can then be processed using a data processor on the remote system to determine the textual information 235, which can then be transmitted back to the digital image capture device 300, or can be stored on a file server 810. The data on the file server 810 can then be accessed by the user to view the textual information 235. The file server 810 can be located in the cloud computing environment 800, or can be a separate storage device such as an Internet-accessible server, or a server on the user's home computer. In some embodiments, the textual information 235 can be transmitted to a used by sending it to an E-mail account 820 as an attachment in an E-mail message.

A computer program product can include one or more non-transitory, tangible, computer readable storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

PARTS LIST 110 data processing system
120 peripheral system
130 user interface system
140 data storage system
200 document
205 capture digital images step
210 digital images
215 pre-process digital images step
220 apply OCR process step
225 textual data
230 merge textual data step
235 textual information
300 digital image capture device
310 user's hand
320 textual content
410 line of text
420 line of text
430 line of text
440 line of text
450 word
460 whitespace
500 parse textual data step
505 parsed text
510 determine corresponding portions step
515 portions that match
520 portions with differences
525 form consensus step
530 consensus portions
535 merge portions step
600 designate reference step
605 reference parsed text
610 non-reference parsed text
615 cross reference lines of text step
620 cross-reference line mapping
625 cross reference words
630 cross-reference word mapping
635 analyze cross-referenced text step
700 reference line of text
705 non-reference line of text
710 non-reference line of text
715 non-reference line of text
720 corresponding words
730 word histogram
750 bin ID 760 histogram bin
770 word
780 word count
800 cloud computing environment
805 computational server
810 file server
820 E-mail account

The invention claimed is:

1. A system for extracting textual information from a document containing text characters, comprising: a network interface for communicating with one or more remote systems over a network; a data processing system; and a program memory communicatively connected to the data processing system and storing instructions configured to cause the data processing system to implement a method for extracting textual information from images of a document containing text characters, wherein the method includes: receiving a plurality of digital images of the document over the network, the plurality of digital images being captured separately using a digital image capture device and including substantially the same image content; automatically analyzing each of the received digital images using an optical character recognition process to determine extracted textual data for each captured digital image; merging the extracted textual data for the received digital images to determine the textual information for the document, wherein differences between the extracted textual data for corresponding portions of the received digital images are analyzed to determine the textual information for corresponding portions of the document; and storing the textual information for the document in a processor-accessible memory, wherein the merging of the extracted textual data for the received digital images includes: analyzing the extracted textual data for the received digital images to determine corresponding portions of the textual data for the received digital images; analyzing the extracted textual data to identify portions of the textual data for the received digital images where the textual data extracted from at least one of the received digital images is different from the textual data extracted from the corresponding portion of another one of the received digital images; and analyzing the differences between extracted textual data for the received digital images to determine the corresponding portion of the textual information for the document.

2. The system of claim 1, wherein the process of determining the corresponding portions of the textual data for the received digital images includes using a global sequence alignment algorithm to align lines of text in the textual data for the received digital images, and to align words within the aligned lines of text.

3. The system of claim 2, wherein the global sequence alignment algorithm is a Needleman-Wunsch algorithm.

4. The system of claim 1, wherein the analysis to determine the corresponding portion of the textual information for the document includes using a majority voting process to select between the corresponding portions of the textual data for the received digital images.

5. The system of claim 1, wherein the analysis to determine the corresponding portion of the textual information for the document includes comparing the extracted textual data for the received digital images to a dictionary.

6. The system of claim 5, wherein the dictionary includes context-dependent words that are relevant to a particular document or document type.

7. The system of claim 5, wherein words are added to the dictionary based on analyzing the extracted textual data for the received digital images.

8. The system of claim 1, wherein the digital image capture device is a hand-held digital image capture device.

9. The system of claim 1, wherein the plurality of digital images are received using a single activation of a user control on the digital image capture device.

10. The system of claim 1, wherein a position of the digital image capture device is moved between capturing successive digital images.

11. The system of claim 1, wherein one or more image capture settings for the digital image capture device are adjusted between capturing successive digital images.

12. The system of claim 11, wherein the adjusted image capture settings include a focus setting or an exposure setting.

13. The system of claim 1, further including using an image alignment process to align the received digital images before they are analyzed using the optical character recognition process.

14. The system of claim 1, wherein the plurality of digital images are received from the digital image capture device or from a network-accessible file server.

15. The system of claim 1, further including transmitting the textual information to the digital image capture device or to a network-accessible file server over the network.

16. The system of claim 1, further including transmitting the textual information to an E-mail account.

17. The system of claim 1, wherein the data processing system is part of a cloud computing environment.

* * * * *